United States Patent
Jeswine

[11] Patent Number: 5,875,627
[45] Date of Patent: Mar. 2, 1999

[54] FLUID PROPULSION SYSTEM FOR ACCELERATING AND DIRECTIONALLY CONTROLLING A FLUID

[76] Inventor: William W. Jeswine, 8500 Perimeter Rd., Seattle, Wash. 98108

[21] Appl. No.: 484,237

[22] Filed: Jun. 7, 1995

[51] Int. Cl.$^6$ .................................................. B63H 25/46
[52] U.S. Cl. ................................ 60/201; 60/221; 60/222; 415/90
[58] Field of Search ........................... 60/201, 221, 222; 415/90

[56] References Cited

U.S. PATENT DOCUMENTS

| | | |
|---|---|---|
| 1,278,750 | 9/1918 | Romualdi . |
| 2,985,406 | 5/1961 | Bump ........................................ 244/10 |
| 3,017,848 | 1/1962 | Bishop ..................................... 60/221 |
| 3,065,928 | 11/1962 | Dornier .................................... 244/10 |
| 3,140,065 | 7/1964 | Alvarez-Calderon .................... 244/10 |
| 3,276,415 | 10/1966 | Laing ....................................... 60/222 |
| 3,630,470 | 12/1971 | Elliott ..................................... 244/21 |
| 4,605,376 | 8/1986 | Aschauer ................................. 60/221 |
| 5,180,119 | 1/1993 | Picard ...................................... 244/10 |

FOREIGN PATENT DOCUMENTS

| | | | |
|---|---|---|---|
| 186516 | 6/1907 | Germany ................................. 415/90 |
| 354634 | 9/1922 | Germany ................................. 415/90 |
| 112318 | 12/1925 | Germany . |
| 89 07073 | 8/1989 | WIPO . |

*Primary Examiner*—Charles G. Freay
*Attorney, Agent, or Firm*—Seed and Berry, LLP

[57] ABSTRACT

A propulsion system for accelerating and directionally controlling a fluid having a continuous dynamic surface for circulating through a fluid from an entrainment region where fluid is introduced to the dynamic surface to a thrust region where fluid is discharged from the dynamic surface. The dynamic surface accelerates the fluid proximate to the surface so as to produce a layer of accelerated fluid from the entrainment region through the thrust region. A motor is operatively connected to the dynamic surface for driving the dynamic surface. A separator plate is positioned next to the dynamic surface. The separator plate has a leading edge for stripping the layer of accelerated fluid from the dynamic surface, and a substantially flat thrust face adjacent to the leading edge for directing the accelerated fluid in a desired direction. The separator plate is positionable with respect to the dynamic surface such that the leading edge is generally in close proximity to the dynamic surface, and the thrust face is substantially tangential to the dynamic surface for at least a portion of the thrust region.

33 Claims, 16 Drawing Sheets

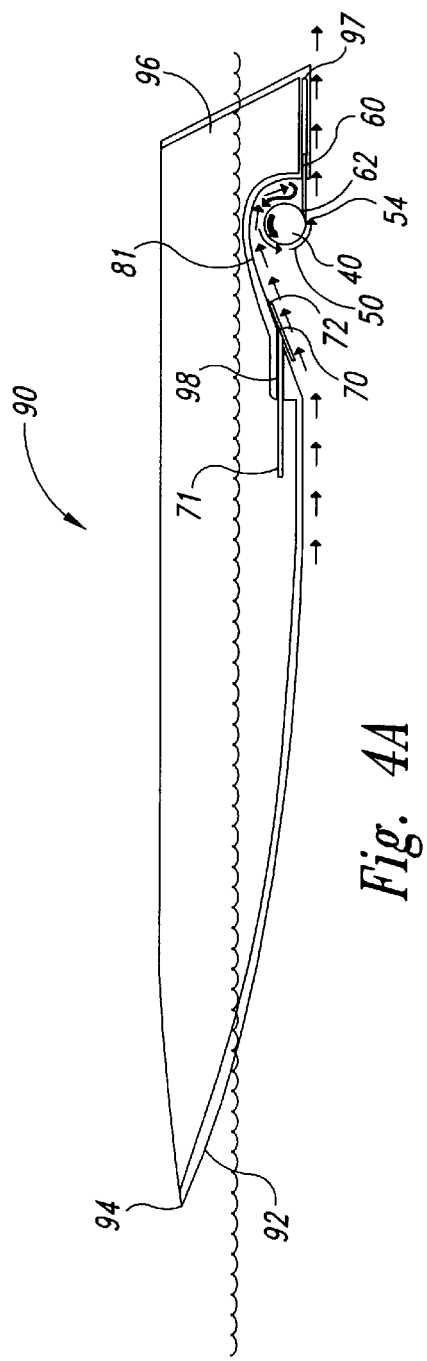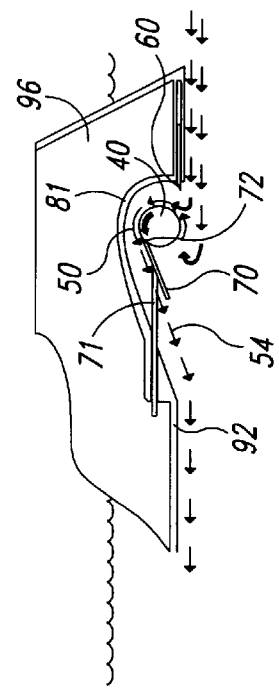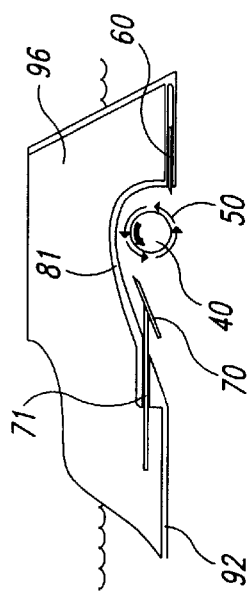

FLUID PROPULSION SYSTEM FOR ACCELERATING AND DIRECTIONALLY CONTROLLING A FLUID

TECHNICAL FIELD

The present invention relates to accelerating and controlling the direction of a fluid using a continuous dynamic surface such as a rapidly rotatable cylinder or a rapidly moveable belt.

BACKGROUND OF THE INVENTION

Airplanes, boats, hovercraft, and other vehicles are propelled by accelerating a fluid to generate a thrust. The thrust produces a force that drives the vehicle in a direction opposite to the direction of the thrust. Conventional propulsion systems generally include propellers and turbines.

Propeller propulsion systems are widely used in connection with airplanes and boats. Propellers, however, are relatively inefficient because a significant percentage of the fluid is directed radially outward away from the desired direction of the thrust. Accordingly, propellers waste energy on fluid that only marginally increases the thrust output. Propellers are also subject to cavitating when operating in water which further reduces their efficiency. Another problem with propellers is that they are dangerous, resulting in severe injury or even death to persons or animals that come into contact with the propellers as they rotate. Lastly, propellers are exceptionally noisy, creating a public nuisance around airports.

Turbines are widely used to propel airplanes. Turbines, however, have limited applications because they are expensive and noisy. Turbines also do not operate in high-density fluids such as water. In light of the problems with propellers and turbines, it would be desirable to develop a propulsion system that is efficient, safe, quiet, and widely applicable to land, sea, and air vehicles.

One alternate propulsion system is a rotating cylinder. Previous inventions regarding rapidly rotating cylinders have generally focused on using cylinders in a fluid flux to generate lift according to the Magnus effect. Although such applications of a rapidly rotating cylinder are useful for lift, they do not address using a rapidly rotating cylinder to generate a thrust force in a static fluid.

Rotating cylinders have not been widely accepted as a fluid propulsion system to date. When a cylinder is rotated in a fluid, the friction between the cylinder and the fluid causes a portion of the fluid to be entrained in a layer about the cylinder. Conventional propulsion systems using rotating cylinders do not generate sufficient thrust without exceeding the physical dimensions of a given vehicle such as wing span (airplanes) or beam (boat and cars). Thus, to date, rotating cylinders have been impractical to use on full-size applications of planes, boats, hovercraft, and other vehicles.

One propulsion system using rotating cylinders is shown in U.S. Pat. No. 2,985,406, issued to H. W. Bump, which discloses two rotatable cylinders that act as the lift and propulsion means for an aircraft. The cylinders are positioned substantially parallel to each other and rotated towards each other so that the air flows around the cylinders and converges at the rear of the cylinders. The air is initially entrained from the space between the cylinders and directed around the outside of the cylinders. If left unobstructed, the direction of the accelerated fluid in the space between the cylinders would generally be opposite to the desired direction of maximum thrust. To appropriately direct the accelerated fluid, Bump places a deflector at the rear portion of the cylinders that separates the accelerated air from the cylinders, and angles it 90° to direct it in the desired direction.

Rotating cylinder propulsion systems have many advantages compared to propellers and turbines. First, such systems are relatively safe compared to propellers because they do not have any blades and they create a layer of inviscid fluid flow next to the cylinder that generally prevents objects from actually contacting the surface of the cylinders. Rotating cylinders are also exceptionally quiet, and equally applicable to operating in air or water. Therefore, it would be desirable to develop an efficient and flexible propulsion system using rapidly rotating cylinders, or another type of continuous dynamic surface such as a rapidly moving belt, for accelerating and directing a static fluid.

SUMMARY OF THE INVENTION

The inventive propulsion system in accordance with the invention is a continuous dynamic surface for circulating through a fluid from an entrainment region to a thrust region. The dynamic surface accelerates the fluid proximate to the surface so as to produce a layer of accelerated fluid from the entrainment region through the thrust region. A motor is operatively connected to the dynamic surface for driving the dynamic surface. A separator plate is positioned next to the dynamic surface. The separator plate has a leading edge for stripping the layer of accelerated fluid from the dynamic surface, and a substantially flat thrust face adjacent to the leading edge for directing the accelerated fluid in a desired direction. The separator plate is positionable with respect to the dynamic surface such that the leading edge is generally in close proximity to the dynamic surface, and the thrust face is substantially tangential to the dynamic surface for at least a portion of the thrust region.

In another embodiment, a propulsion system in accordance with the invention has a plurality of cylinders. Each cylinder has an outer surface that is rotatable through the fluid from an entrainment region to a thrust region for producing a layer of accelerated fluid about each outer surface. The cylinders are spaced apart to define an entrainment convergence zone between the cylinders, and the cylinders are rotated inwardly toward the convergence zone so that the accelerated fluid from each cylinder flows through the convergence zone in a desired direction of thrust. A motor is operatively attached to the cylinders for driving the cylinders at a rapid rate. A plurality of moveable thrust separator plates, each having a leading edge and a thrust face, are positioned next to the cylinders so that each cylinder has at least one corresponding separator plate positioned in its thrust region. Each separator plate is positionable in the convergence zone and moveable with respect to its corresponding cylinder.

BRIEF DESCRIPTION OF THE DRAWINGS

FIG. 4A is a rapidly rotating cylinder of a fluid propulsion system in accordance with the invention used to in connection with a watercraft in forward drive.

FIG. 4B is the rapidly rotating cylinder of FIG. 4A in a neutral drive.

FIG. 4C is the rapidly rotating cylinder of FIG. 4A in reverse drive.

DETAILED DESCRIPTION OF THE INVENTION

FIGS. 1–17 illustrate fluid propulsion systems in accordance with the invention for accelerating and directionally controlling a fluid to produce a thrust. For the purposes of definition, "thrust" is generically used to indicate a flow of accelerated fluid in a given direction, and "lift" is used to indicate a generally vertically directed thrust. Like reference numbers are used to refer to the like parts throughout the various figures.

Figure 1:
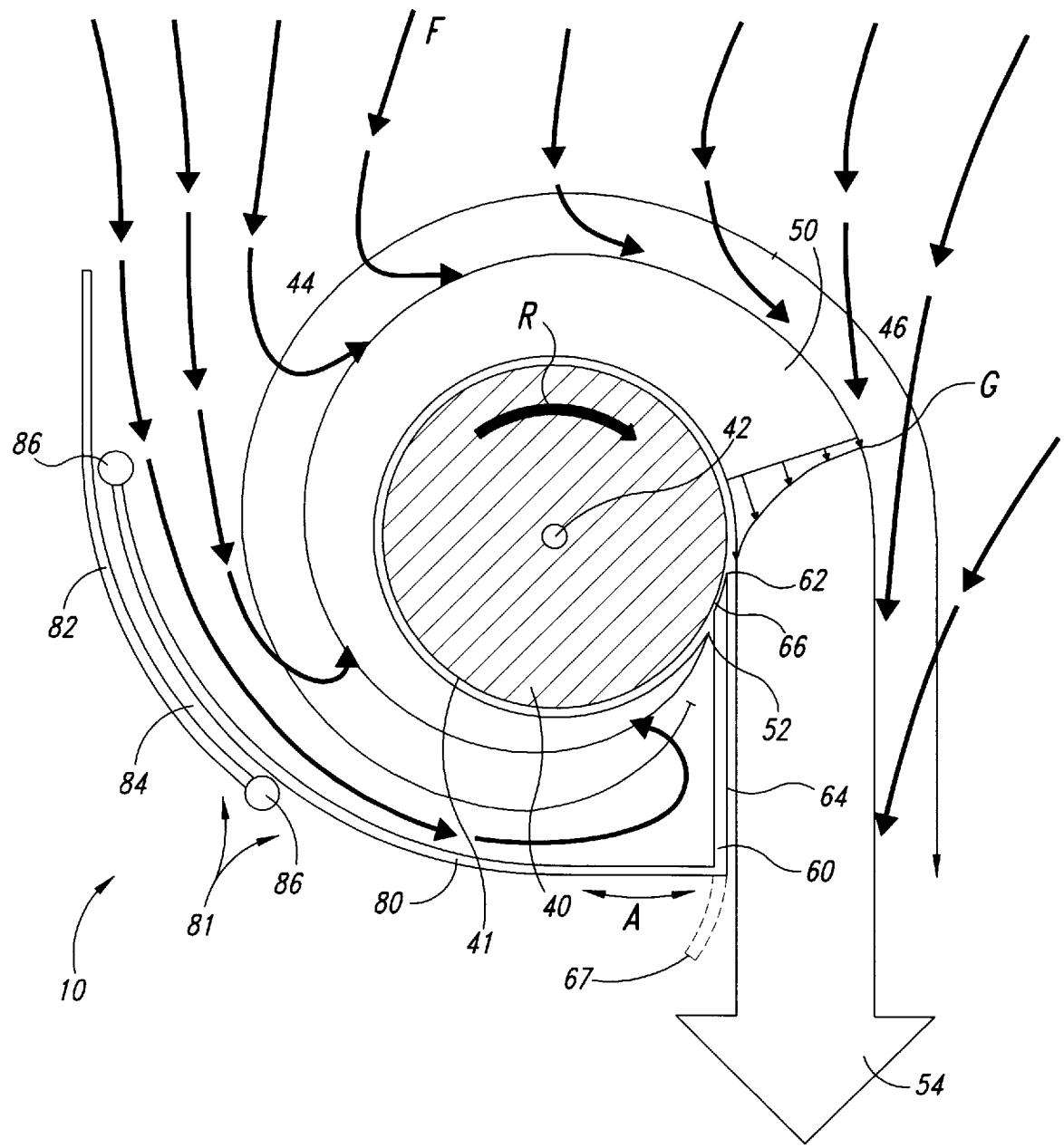
FIG. 1 is a cross-section view of a rapidly rotating cylinder fluid propulsion system in accordance with the invention.

FIG. 1 is a cross-sectional view of a fluid propulsion system 10 having a continuous dynamic surface that is a single, rapidly rotating cylinder 40. The cylinder has an outer surface 41 and is mounted on a rotatable a shaft 42. As the cylinder 40 rotates, any given point on the outer surface 41 continuously rotates through the fluid from an entrainment region 44 to a thrust region 46. The frictional interface between the outer surface 41 and the fluid F creates a layer of accelerated fluid 50 from a point 52 located at the beginning of the entrainment region 44 to a thrust band 54 located at the end of the thrust region 46. The thickness of the layer 50 grows radially outwardly from the outer surface 41 as it progresses through the entrainment and thrust regions 44 and 46. A velocity gradient G is present in the layer 50 such that the fluid near the outer surface 41 moves faster than the fluid along the outer edge of the layer 50 at the same radial position with respect to the cylinder 40.

A separator plate 60 is positioned in the thrust region 46 to strip the layer of accelerated fluid 50 away from the cylinder 40 and direct it in a desired direction. The separator plate 60 has a leading edge 62 that is positioned in close proximity to the outer surface 41 of the cylinder 40, and a thrust face 64 adjacent to the leading edge 62. The thrust face 64 is preferably flat or substantially flat, and it is positioned to extend substantially tangential to the outer surface 41. By using a flat or substantially flat thrust face 64 positioned tangentially to the outer surface 41, the accelerated fluid is efficiently stripped from the outer surface 41 with a minimal loss of energy. The substantially flat, tangential face 64 reduces the energy loss of stripping the accelerated fluid from the boundary layer compared to vanes that are uneven or non-tangential because the thrust face 64 only reduces the rotational energy of the fluid; other uneven or non-tangential vanes tend to reduce both the rotational and linear energy of the fluid. The separator plate 60 may also have a contoured surface 67 (shown in phantom) beyond the thrust face 64. In a preferred embodiment, a curved inner surface 66 having a radius that is substantially the same as that of the outer surface 41 is positioned on the other side of the plate 60 near the leading edge.

An entrainment scoop 81 is positioned about a portion of the cylinder 40 to direct more fluid into contact with the cylinder, and prevent the accelerated fluid from wrapping around the separator plate 60 and returning to the entrainment region 44. In one embodiment, the entrainment scoop 81 is a curved leaf 80 that is connected to the distal end of the separator plate 60 and extends around a portion of the cylinder 40. In another embodiment, the entrainment scoop 81 has a plurality of segments including the curved leaf 80 and an outer leaf 82 outside of the curved leaf 80. The curved leaf 80 and outer leaf 82 overlap one another along an area 84 extending generally parallel to the rotational axis of the cylinder 40. Guides 86 are positioned on the adjacent ends of the curved leaf 80 and outer leaf 82 for guiding the curved leaf 80 under the outer leaf 82 as the curved leaf 80 is moved about the cylinder 40 as shown by the arrow A.

The entrainment scoop 81 significantly enhances the thrust output of the rotating cylinder 40. The thrust generated by the rotating cylinder 40 causes the vehicle to which it is connected to move through the fluid medium. As the vehicle moves, it creates a fluid flux over the cylinder 40. Accordingly, a Magnus effect is created over the cylinder 40 such that a low pressure zone is created at the leading edge 62 and a high pressure zone is created next to the outer surface 41 in the entrainment region 44. The entrainment scoop 81 contains the high pressure against the cylinder 40, causing more friction between the outer surface 41 and the fluid. The layer of accelerated fluid 50, therefore, grows faster and larger than without the entrainment scoop 81.

In operation, the outer surface 41 preferably moves at an extremely high velocity. Depending upon the radius of the cylinder 40 and the type of fluid medium, the cylinder 40 generally rotates at approximately 500–12,000 r.p.m. in water or approximately 18,000–100,000+ in air. The scope of the invention is not limited to the above-listed rates of rotation, and other rates of rotation may be used. When used in water, for example, the velocity of the outer surface 41 is generally several hundred feet per second (e.g., 471.24 ft/s for a cylinder having a 6-inch radius and traveling at 9,000 rpm). The friction between the fluid medium and the outer surface 41 of the cylinder 40 causes the layer 50 to grow at a rapid rate in the entrainment region 44. As shown by the fluid flow arrows F, the entrainment scoop 81 enhances the growth of the boundary layer 50 throughout the entrainment region 44, while additional fluid is still entrained into the layer 50 in the thrust region. The velocity of the layer 50 is a function of the velocity of the outer surface 41 of the cylinder and viscosity of the fluid. The vehicle is propelled at a desired velocity and in a desired direction by varying the velocity of the cylinder 40 and tangential position of the thrust face 64 about the outer surface 41.

Figure 2A:
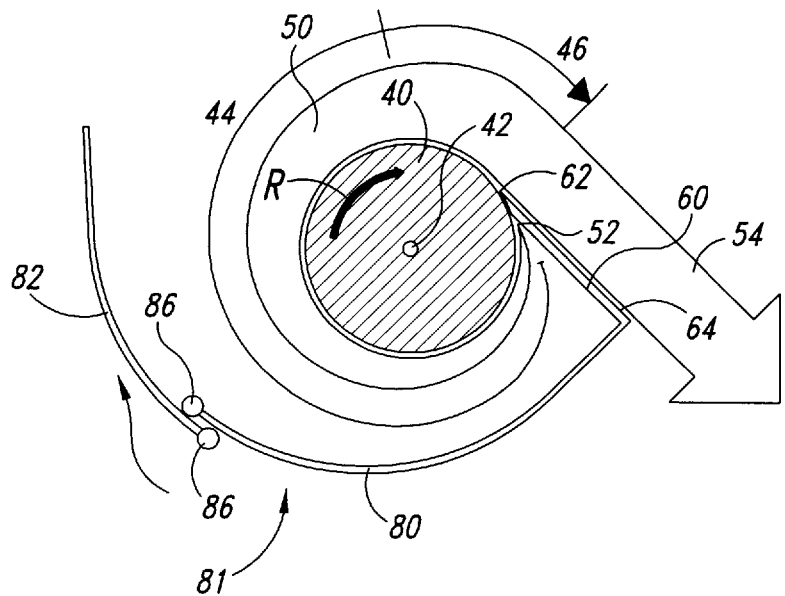
FIG. 2A is another cross-section view of a rapidly rotating cylinder of the fluid propulsion system of FIG. 1.
Figure 2B:
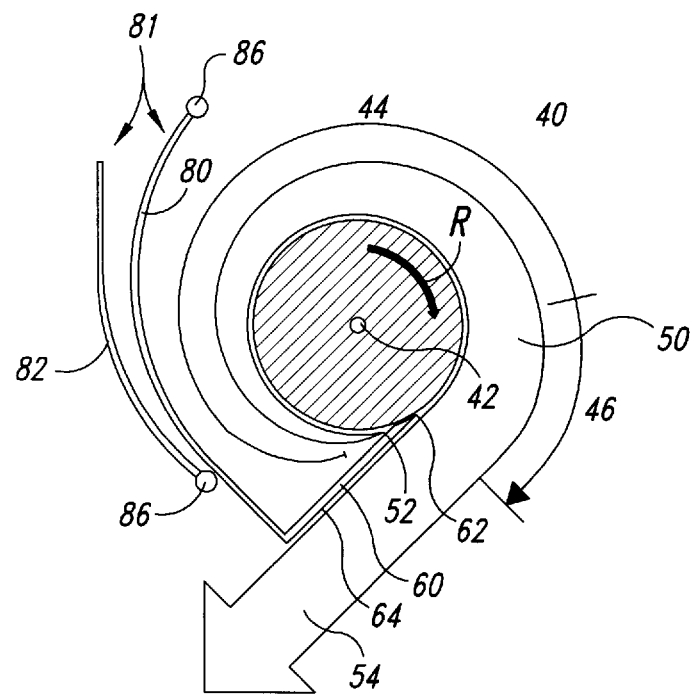
FIG. 2B is another cross-section view of a rapidly rotating cylinder of the propulsion system of FIG. 1.

FIGS. 2A and 2B illustrate the directional control of an accelerated fluid using a single rotating cylinder 40. As shown in FIG. 2A, the separator plate 60 is rotated radially about the cylinder 40 to direct the thrust 54 across the thrust face 64 to the right side of the cylinder. FIG. 2B illustrates the separator plate 60 radially positioned about the cylinder 40 so that the thrust 54 is directed to the left side of the cylinder.

The position of the separator plate 60 with respect to the cylinder 40 also affects the size and location of the entrainment and thrust regions 44 and 46. The entrainment region 44 begins to the right of the cylinder 40 when a right-hand thrust is generated as shown in FIG. 2A. In the case of directing the thrust to the left of the cylinder 40 as shown in FIG. 2B, the entrainment region 44 starts to the left side of the cylinder 40.

Figure 3A:
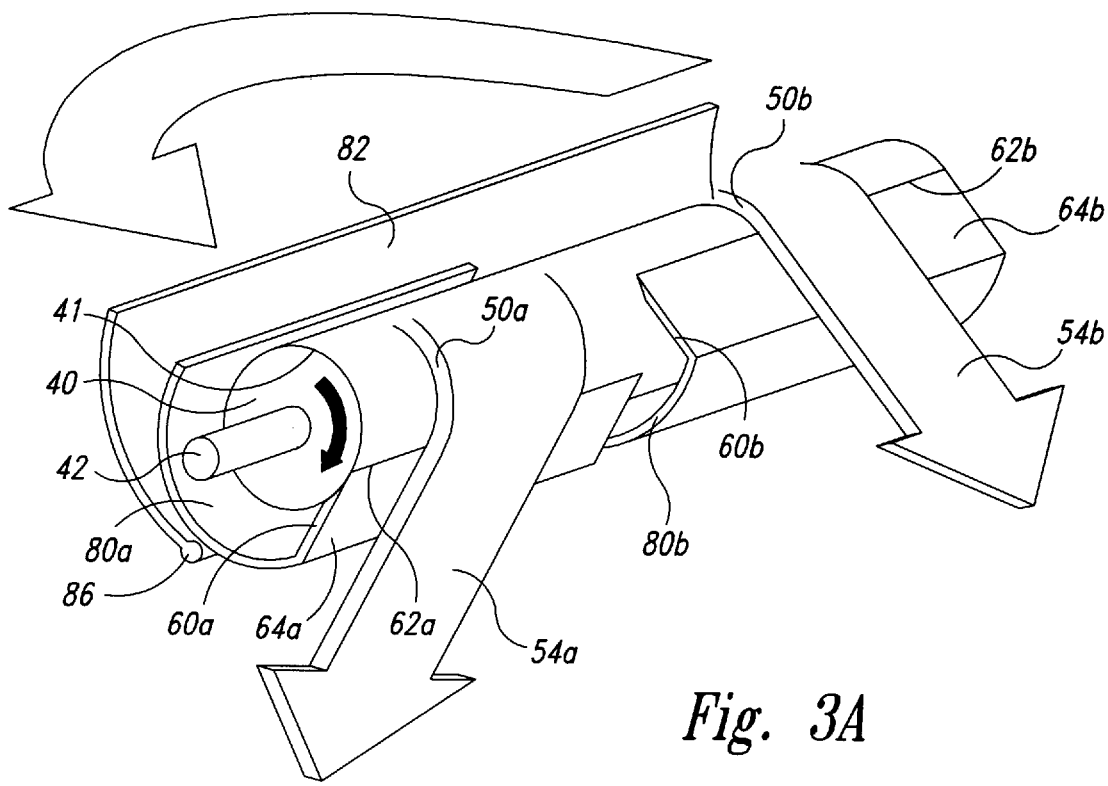
FIG. 3A is an isometric view of a rapidly rotating cylinder of a fluid propulsion system in accordance with the invention having a plurality of separator plates.
Figure 3B:
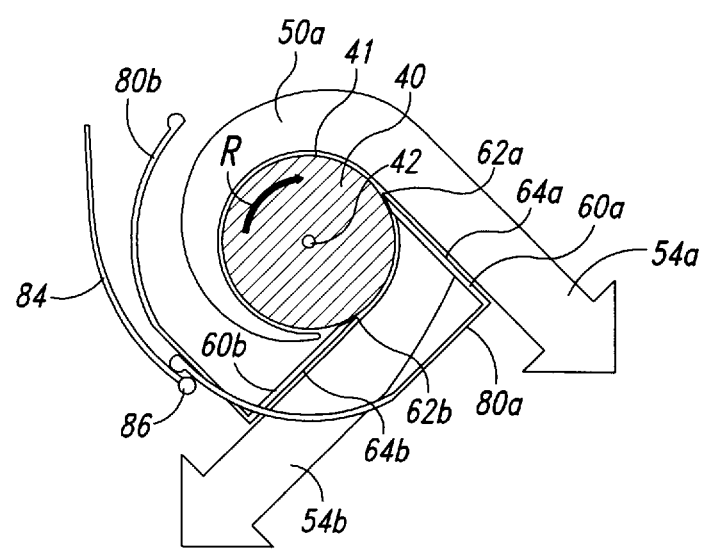
FIG. 3B is cross-section view of the propulsion system of FIG. 3A.

FIGS. 3A and 3B illustrate a rotating cylinder 40 in which the separator plate is divided into a first section 60*a* having a leading edge 62*a* and a second section 60*b* having a leading edge 62*b*. The first and second sections 60*a* and 60*b* are divided along a boundary that is substantially perpendicular to the outer surface 41. The first and second sections 60*a* and 60*b* are also independently positionable about the outer surface 41. The first section 60*a* separates the accelerated fluid in layer 50*a* from the cylinder 40 and directs it across its thrust face 64*a*, while the second section 60*b* splits the accelerated fluid into a second layer 50*b* and directs it across its thrust face 64*b*. In a preferred embodiment, the first section 60*a* has a first curved leaf 80*a* attached to the end of its thrust face 64*a*, and the second section 60*b* has a second curved leaf 80*b* attached to the end of its thrust face 64*b*. As with the first and second sections 60*a* and 60*b*, the curved leaves 80*a* and 80*b* are independently positionable about the cylinder 40. A single outer leaf 82 is positioned outside of the curved leaves 80*a* and 80*b*. The outer leaf 82 preferably extends substantially the full length of the cylinder 40. By providing independently positionable section 60*a* and 60*b*, the accelerated fluid may be split such that thrust 54*a* is directed to the left of the cylinder 40 while the thrust 54*b* is directed to the right of the cylinder 40, as shown in FIG. 3A. Conversely, the first and second sections 60*a* and 60*b* may be rotated about the cylinder 40 so that the thrust 54*a* is directed to the right of the cylinder while the thrust 54*b* is directed to the left, as shown in FIG. 3B. Separator plates with multiple sections about a single rotating cylinder provide enhanced directional control of a vehicle.

FIGS. 4A–4C illustrate an application of a single rapidly rotating cylinder 40 on a watercraft 90 with a bottom 92 that extends between a bow 94 and a stem 96. In one embodiment, the rapidly rotating cylinder 40 is mounted horizontally across the beam of the boat 90, and the entrainment scoop 81 is formed into the bottom 92. The rotating cylinder 40 is preferably positioned such that its lowermost surface is substantially even with the plane defined by the bottom 92 at the stern 96. The separator plate 60 is partially positioned in a pocket 97 located in the bottom 92 at the stern 96. The separator plate 60 is reciprocally moveable between an engaged or stripping position in which its leading edge 62 is in close proximity to the cylinder 40 and a retracted position in which it is received in the pocket 97. In a preferred embodiment, the separator plate 60 moves substantially parallel to the bottom 92 and tangential to the bottom of the rotating cylinder 40. A reverse plate 70 is positioned on the forward side of the rotating cylinder 40 and angled upwardly towards the transom of the watercraft. The reverse plate 70 is connected to a reciprocating rod 71, which is positioned through an opening 98 for reciprocal movement between an engaged position and a retracted position.

Figure 5A:
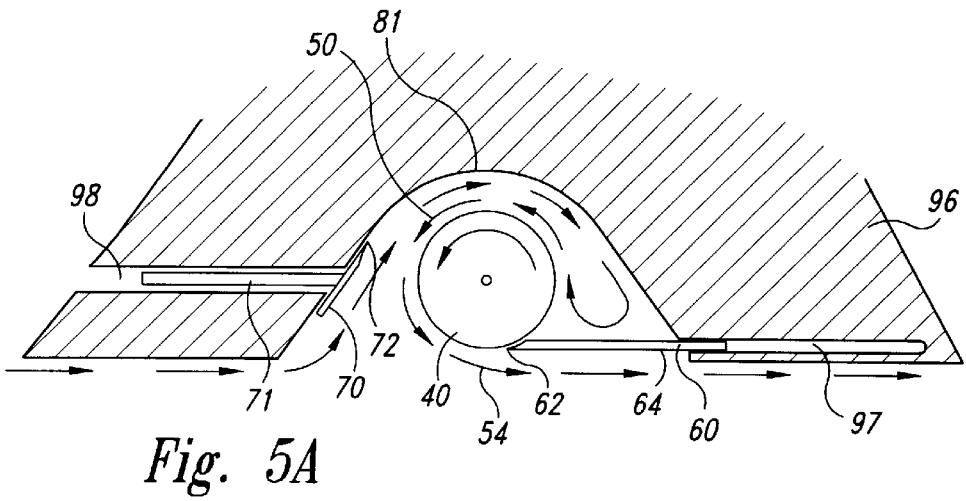
FIG. 5A is a detail cross-section view of the rapidly rotating cylinder of FIG. 4A.

FIGS. 4A and 5A illustrate the single cylinder propulsion system in forward drive. To generate a forward thrust, the separator plate 60 is positioned in its engaged position, and the reverse plate 70 is positioned in its retracted position against the forward portion of the entrainment scoop 81. As the cylinder 40 rotates, the fluid in the entrainment region is accelerated and directed rearwardly towards the separator plate as discussed above with respect to FIG. 1. As the accelerated fluid 50 approaches the lowermost portion of the rotating cylinder 40, the leading edge 62 separates the thrust 54 from the cylinder 40 and the thrust face 64 directs the thrust 54 on a vector that is substantially parallel to the bottom 92.

Figure 5B:
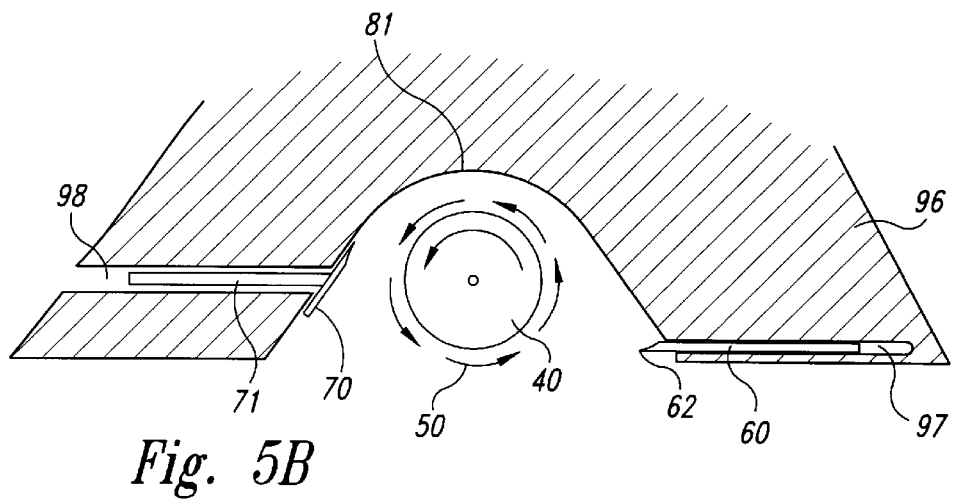
FIG. 5B is a detail cross-section view of the rapidly rotating cylinder of FIG. 4B.

FIGS. 4B and 5B illustrate the single cylinder propulsion system in neutral drive. The separator plate 60 and reverse plate 70 are both positioned in their retracted positions. The separator plate 60 may be either partially retracted as shown in FIG. 4B or fully retracted as shown in FIG. 5B. No thrust is generated when both plates are in their retracted position because none of the accelerated fluid is separated from the cylinder 40. Accordingly, the forces of the accelerated fluid about the cylinder 40 cancel each other out, effectively resulting, in a neutral drive.

Figure 5C:
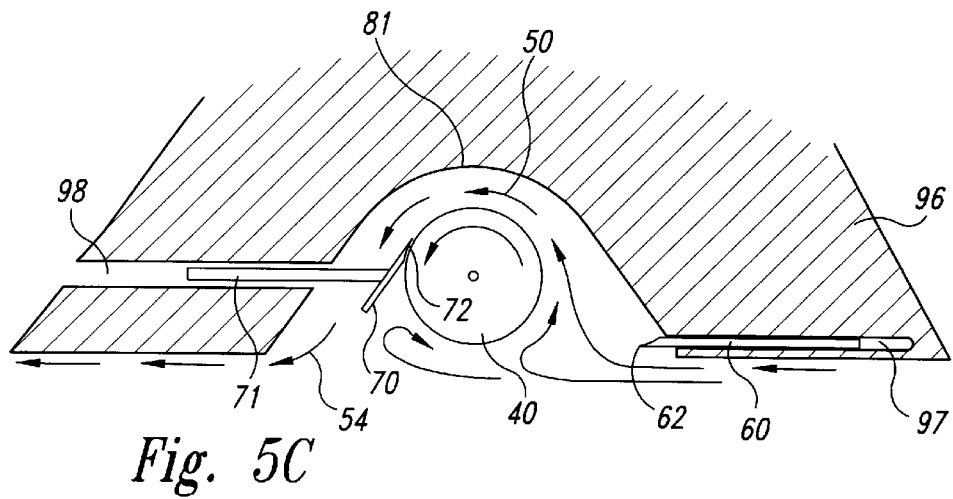
FIG. 5C is a cross section of the rapidly rotating cylinder of FIG. 4C.

FIGS. 4C and 5C illustrate the single cylinder propulsion system in reverse drive. The separator plate 60 is retracted into the pocket 97, and the reverse plate 70 is in engaged position so that its leading edge 72 is positioned proximate to the forward side of the rotating cylinder 40. As the cylinder 40 rotates, the fluid is entrained into the entrainment scoop on the aft side of the cylinder 40 and directed at a downward angle towards the bow 94 by the thrust face 74.

In another embodiment (not shown), the horizontal rotating cylinder 40 depicted in FIGS. 4A–4C and 5A–5C has a multi-section separator plate and a multi-section reverse plate. The combination of multi-section separator and reverse plates splits the fluid flow about the cylinder to imitate conventional twin screw propulsion systems. For example, a left turn may be executed by positioning the left separator and reverse plates in reverse drive and the right separator and reverse plates in forward drive. Conversely, a right turn may be executed by positioning the left separator and reverse plates in forward drive and the right separator and reverse plates in reverse drive.

Figure 6A:
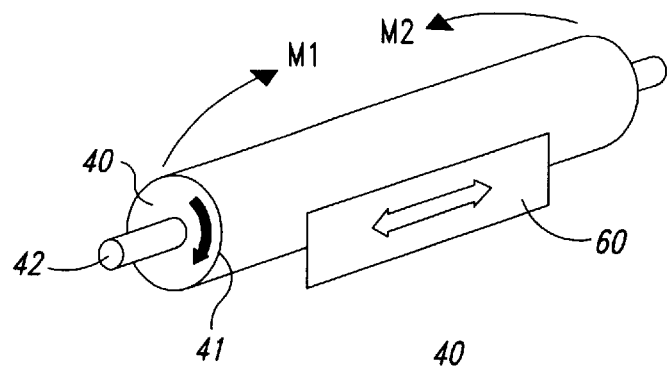
FIG. 6A is a schematic illustration of a rotating cylinder and longitudinally moveable separator plate of a fluid propulsion system in accordance with the invention.
Figure 6B:
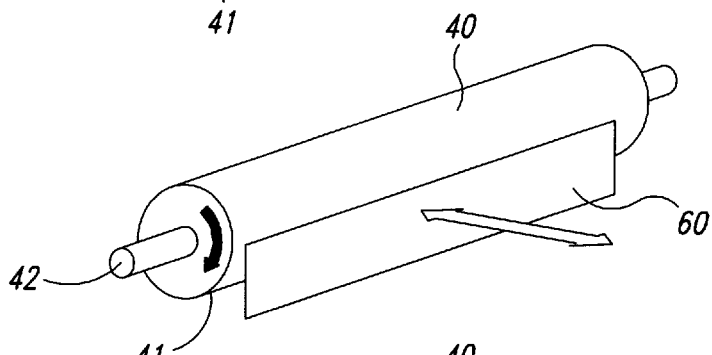
FIG. 6B is a schematic illustration of a rotating cylinder and radially moveable separator plate of a fluid propulsion system in accordance with the invention.
Figure 6C:
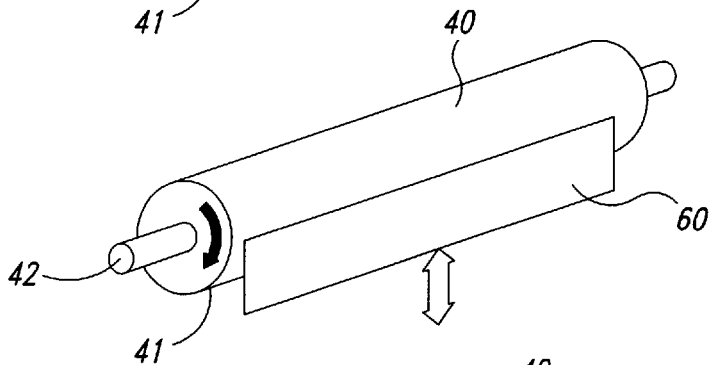
FIG. 6C is a schematic illustration of a rotating cylinder and tangentially moveable separator plate of a fluid propulsion system in accordance with the invention.
Figure 6D:
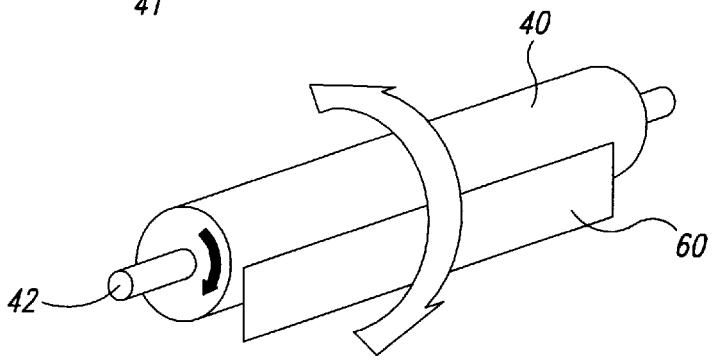
FIG. 6D is a schematic illustration of a rotating cylinder and rotatably moveable separator plate of a fluid propulsion system in accordance with the invention.
Figure 6E:
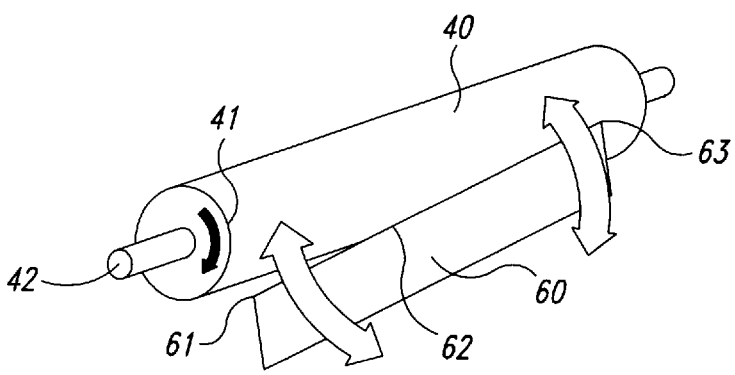
FIG. 6E is a schematic illustration of a rotating cylinder and an angularly moveable separator plate of a fluid propulsion system in accordance with the invention.

FIGS. 6A–6E schematically illustrate the positionability of the separator plate 60 about the cylinder 40. In FIG. 6A, the separator plate 60 is positionable along the longitudinal length of the cylinder 40 substantially parallel to the shaft 42. By adjusting the longitudinal position of the separator plate 60 with respect to the cylinder 40, the accelerated fluid may be selectively separated from the rotating cylinder 40 to generate a moment force $M_1$ (separator plate 60 positioned left of center) or $M_2$ (separator plate 60 positioned right of center). Referring to FIG. 6B, the separator plate 60 is positionable radially outward from and substantially perpendicular to the outer surface 41. Radial positioning of the separator plate 60 adjusts the amount of accelerated fluid that is separated from the cylinder 40. The separator plate 60 may be positioned sufficiently radially outwardly from the cylinder 40 so that it disengages the layer of accelerated fluid to prevent any thrust from being generated. In FIG. 6C, the separator plate is positionable along a tangent to the outer surface 41. As with the radial positioning shown in FIG. 6B, tangential positioning of the separator plate reduces the amount of accelerated fluid that is separated from the cylinder 40. FIG. 6D illustrates rotational positioning of the separator plate 60 about the cylinder 40 as discussed with respect to FIGS. 2A and 2B. In FIG. 6E, the leading edge 62 of the separator plate 60 is angularly adjustable with respect to the cylinder 40. A first end 61 of the leading edge 62 is positioned away from the outer surface 41, while a second end 63 of the leading edge 62 is closely juxtaposed to the outer surface 41. By angularly adjusting the leading edge 62 with respect to the cylinder 40, slight variations in the mass inertia and direction of the thrust may be achieved to trim the ride of the vehicle or adjust its velocity.

Figure 7:
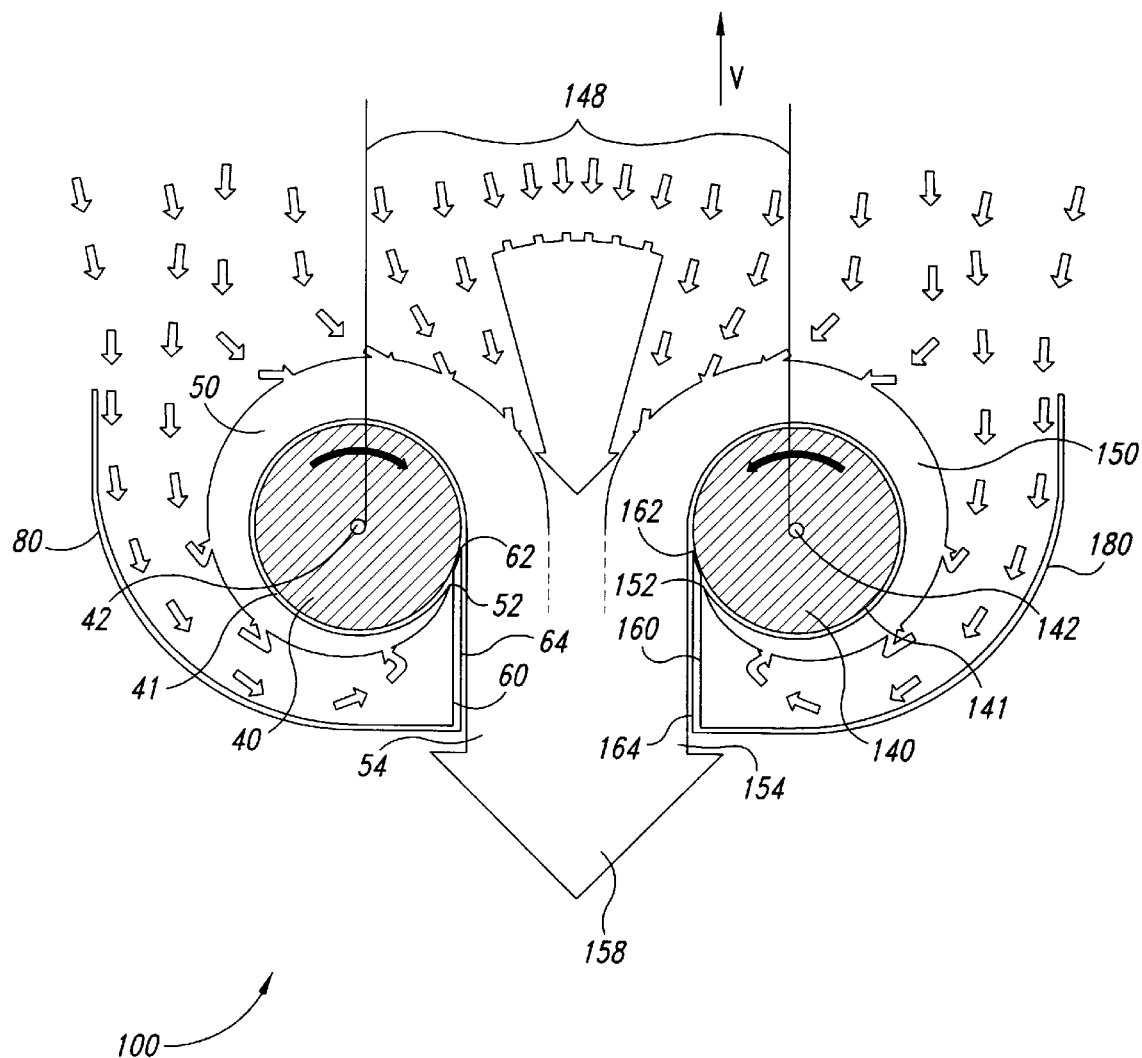
FIG. 7 is a cross-section view of a dual cylinder fluid propulsion system in accordance with the invention.

FIGS. 7–14 depict another embodiment of the invention in which a propulsion system in accordance with the invention includes a plurality of rotating cylinders for producing either an augmented thrust vector or a plurality of thrust vectors. Referring to FIG. 7, the propulsion system 100 includes a first rotating cylinder 40 and a second rotating cylinder 140. A separator plate 60 and a curved leaf 80 are operatively positioned about the first cylinder 40 as discussed above with respect to FIGS. 1–6. A separator plate 160 and curved leaf 180 are similarly positioned about the second rotating cylinder 140. In a preferred embodiment, the second separator plate 160 has a leading edge 162 positioned in close proximity to the outer surface 141 of the second roller 140 and a substantially flat thrust face 164 adjacent to the leading edge 162. The thrust face 164 preferably extends substantially tangential to the outer surface 141, and it is rotatable about the outer surface 141 such that it remains in a substantially tangential relationship with the outer surface 141 throughout its range of motion. The first and second cylinders 40 and 140 are positioned in a spaced-apart relationship such that the separator plates 60 and 160 are juxtaposed to one another across an entrainment convergence zone 148. In a preferred embodiment, the cylinders 40 and 140 are configured in an opposing pair in which the drive shafts 42 and 142 are substantially parallel to one another. The separator plates 60 and 160, therefore, are positioned opposite and substantially parallel to one another across the convergence zone 148.

In operation, the first cylinder 40 entrains fluid from a point 52 into a layer of accelerated fluid 50 that passes across the thrust face 64 in a desired direction as thrust 54. The second cylinder 141 similarly entrains fluid from a point 152 into a layer of accelerated fluid 150 that passes across the thrust face 164 in a desired direction as thrust 154. As the layers of accelerated fluid 50 and 150 converge in the convergence zone 148, they tend to entrain more fluid into the thrust than compared to single rotating cylinders, resulting in an augmented thrust 158. The augmented thrust 158 has a significantly higher mass inertia than the sum of the singular thrusts 54 and 154 without augmentation. The mass inertia of the augmented thrust 158 is affected by the size of the convergence zone 148 and the relative position of the drive shafts 42 and 142. It will be appreciated that the augmentation of the individual thrusts 54 and 154 is reduced if the convergence zone is either too large or too small, or if the shafts 42 and 142 are positioned in different horizontal planes. Accordingly, in applications requiring maximum thrust augmentation, it is desirable to optimize the size of the convergence zone 148 with respect to the radius of the rotating cylinders 40 and position the rotating shafts 42 and 142 on a common plane.

The direction of rotation of the cylinders is an important aspect of the multi-cylinder embodiments of the invention. To generate maximum thrust for driving a vehicle in the direction V, the first cylinder 40 rotates clockwise and the second cylinder 140 rotates counter-clockwise toward the convergence zone 148. Thus, the layers of accelerated fluid 50 and 150 flow from the outside of the cylinders, through the convergence zone 148 between the cylinders, and over the thrust separator plates 60 and 160. By rotating the cylinders 40 and 140 so that the layers of accelerated fluid 50 and 150 flow through the convergence zone 148 between the cylinders, the flow becomes augmented as discussed above and no energy is lost on deflector plates that direct the flow more than tangentially from the cylinders.

Figure 8:
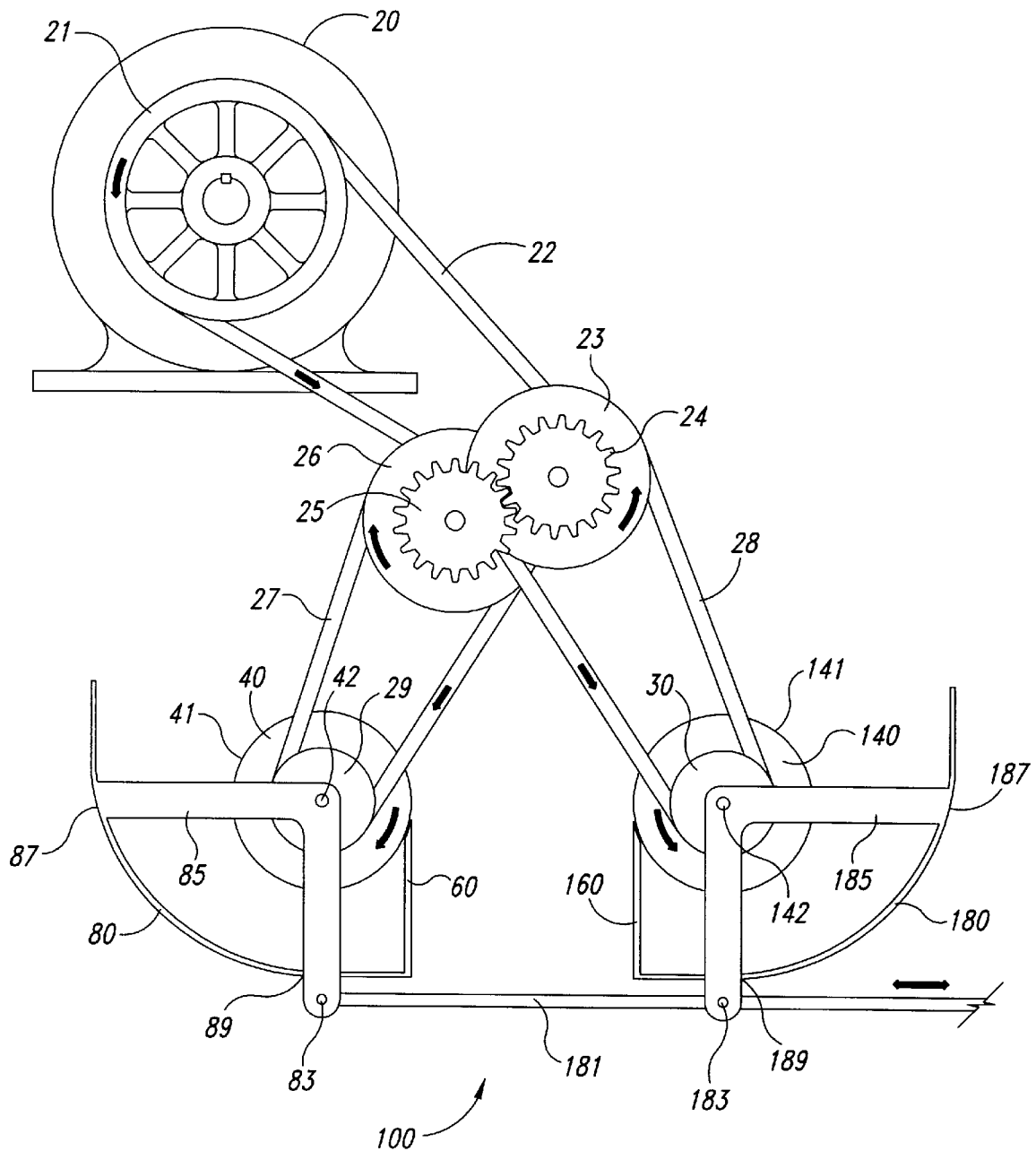
FIG. 8 is a top elevational view of a dual cylinder fluid propulsion system in accordance with the invention.

FIG. 8 illustrates the connection of a drive motor 20 and a turning rod 181 to a propulsion system 100 having two rotating cylinders 40 and 140. The drive system includes a first pulley 21, a second pulley 23, and a third pulley 26. The first pulley 21 is attached to the drive shaft of the motor 20, and the second and third pulleys 23 and 26 are mounted to separate rotating shafts. The second pulley 23 has a gear 24 meshed with a gear 25 attached to the third pulley 26. The gear 24 engages the gear 25 so that rotation of the second pulley 23 in one direction imparts rotation to the third pulley 26 in the opposite direction. A fourth pulley 29 is attached to the shaft 42 of the first cylinder 40, and a fifth pulley 30 is attached to the shaft 142 of the second cylinder 140. A first drive belt 22 is positioned between the first pulley 21 and the second pulley 23, a second drive belt 27 is positioned between the third pulley 26 and the fourth pulley 29, and a third drive belt 28 is positioned between the second pulley 23 and the fifth pulley 30. In operation, the motor 20 rotates the first pulley 21 to drive the first belt 22 and the second pulley 23. The second pulley 23 drives both the third belt 28 and the third pulley 26. The second belt 27 and third belt 28 drive the rollers 40 and 140, respectively.

The turning mechanism includes a bracket 85 pivotally connected to the shaft 42 and fixedly connected to the curved leaf 80 at opposing points 87 and 89. A bracket 185 is similarly attached to the shaft 142 and fixedly attached to the curved leaf 180 at points 187 and 189. A rod 181 is pivotally attached to the ends of the brackets 85 and 185 by pins 83 and 183, respectively. In operation, axial movement of the rod 181 causes the brackets 85 and 185 to pivot about the shafts 42 and 142. As the brackets 85 and 185 pivot about their respective shafts, the separator plates 60 and 160 and curved leaves 80 and 180 rotate about the cylinders 40 and 140 to direct the thrust in a desired direction.

Figure 9A:
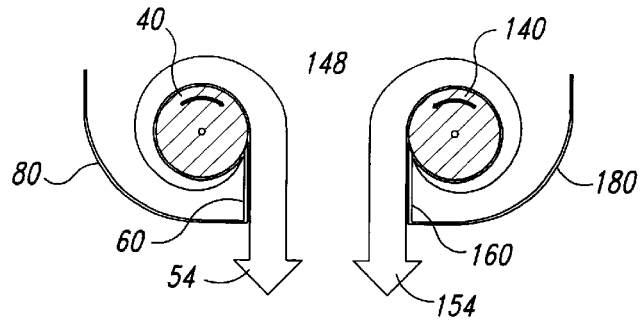
FIG. 9A is a cross-section view of a dual cylinder fluid propulsion system in accordance with the invention in forward drive.
Figure 9B:
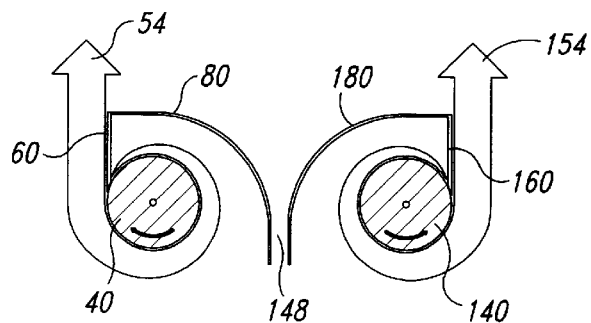
FIG. 9B is a cross-section view of a dual cylinder fluid propulsion system in accordance with the invention in reverse drive.
Figure 9C:
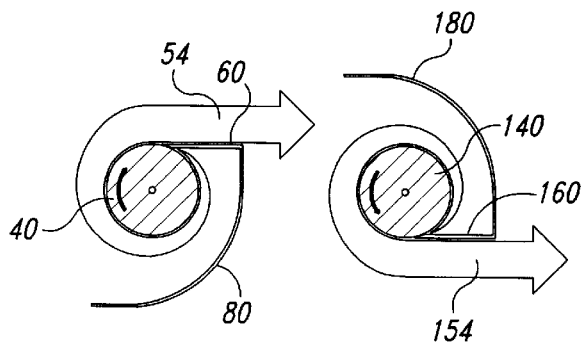
FIG. 9C is a cross-section view of a dual cylinder fluid propulsion system in accordance with the invention producing a lateral thrust.
Figure 9D:
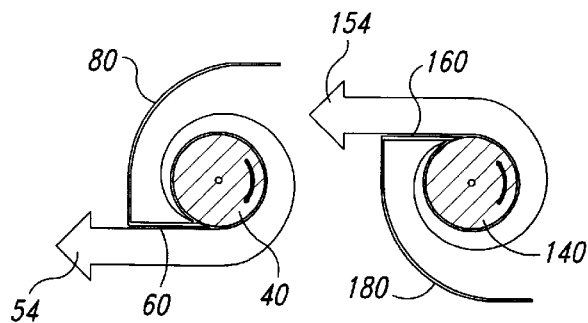
FIG. 9D is a cross-section of a dual cylinder fluid propulsion system in accordance with the invention producing another lateral thrust.

FIGS. 9A–9D illustrate another embodiment of the invention in which the two rotating cylinders 40 and 140 have independently controlled separator plates and entrainment scoops. In FIG. 9A, the separator plates 60 and 160 are positioned in the convergence zone 148 as discussed with respect to FIG. 7 above to generate maximum thrust in a forward direction. FIG. 9B shows separator plates 60 and 160 positioned on opposite sides of the cylinders 40 and 140 outside of the convergence zone 148 to generate separate thrusts 54 and 154 in a reverse direction. The reverse thrusts 54 and 154 are not augmented as shown in FIG. 9A because the thrusts are not combined in the convergence zone 148 to enhance the entrainment of static fluid into the layers of accelerated fluid. FIG. 9C illustrates the separator plates 60 and 160 positioned about their respective cylinders to generate a lateral thrust in one direction, and FIG. 9D illustrates the separator plates 60 and 160 positioned to generate a lateral thrust in the opposite direction.

Figure 10:
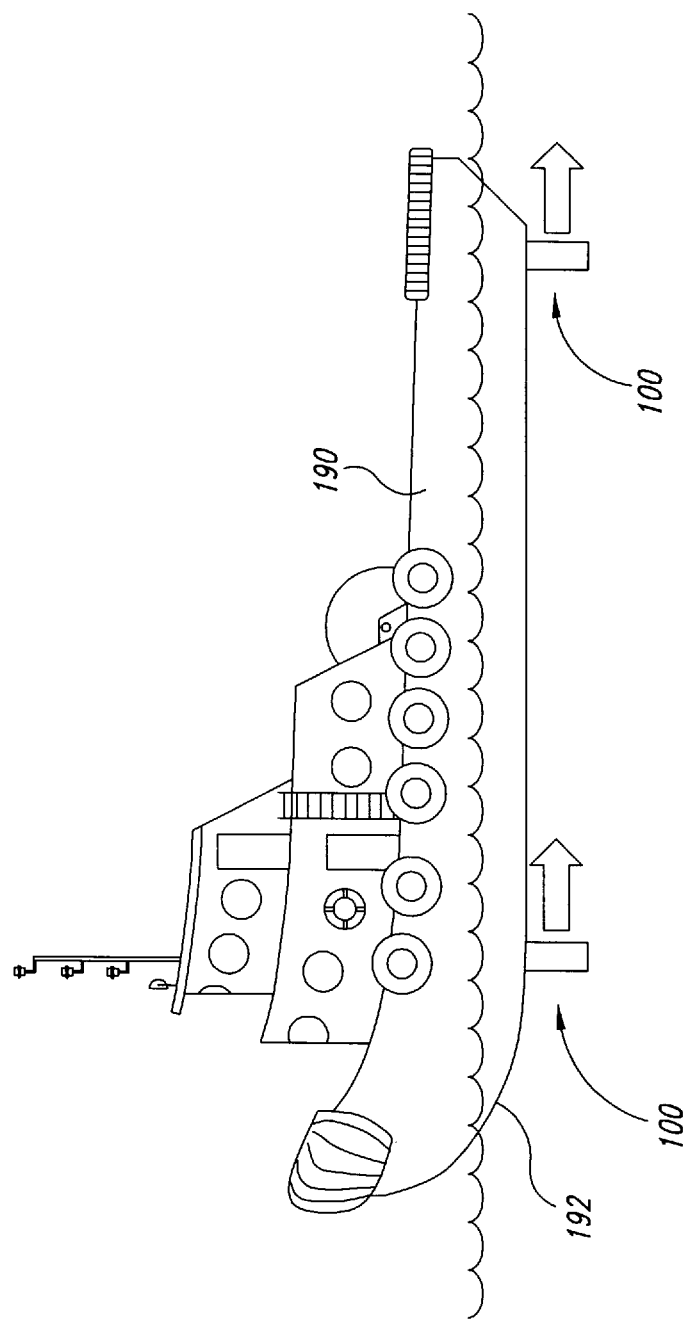
FIG. 10 is a dual cylinder fluid propulsion system in accordance with the invention used in connection to propel a watercraft.

FIG. 10 is a side view illustrating an application of two dual cylinder propulsion systems 100 mounted to the bottom 192 of a tugboat 190. The propulsion systems are mounted to the tugboat so that their rotational axes extend vertically downward from the bottom 192. To produce maximum forward thrust, the separator plates of the cylinders are positioned as shown in FIG. 9A to drive the tug forward with maximum force.

Figure 11A:
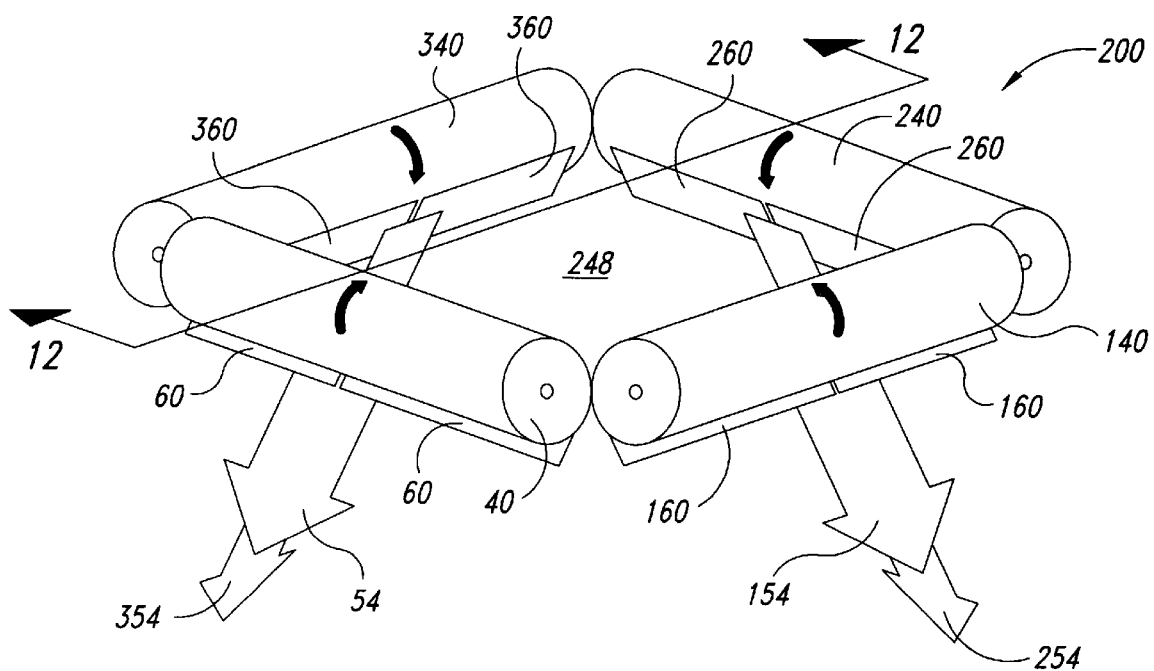
FIG. 11A is an isometric view of a multiple cylinder propulsion system in accordance with the invention.

FIG. 11A illustrates a fluid propulsion system 200 having four cylinders 40, 140, 240, and 340. The cylinders are positioned end to end and substantially perpendicular to their adjacent cylinders to form a convergence zone 248 having a rectilinear shape. As with the dual cylinder propulsion system 100, the rotational direction of the cylinders is an important aspect of the invention. To obtain maximum augmentation of the fluid flow, the cylinders rotate inwardly towards the convergence zone 248 so that the accelerated fluid flows through the convergence zone 248 between the cylinders, and then out of the convergence zone in a desired direction of maximum thrust.

Each cylinder has at least one corresponding separator plate positioned in its thrust region. In one embodiment, cylinder 40 has two separator plates 60, cylinder 140 has two separator plates 160, cylinder 240 has separator plates 260, and cylinder 340 has separator plates 360. Each separator plate is positionable with respect to its corresponding cylinder so that the individual thrust vectors associated with each cylinder may be separately controlled. As shown in FIG. 11A, the thrust vectors 54, 154, 254, and 354 may be separated from their corresponding cylinders and directed downwardly and outwardly from the convergence zone 248.

Figure 11B:
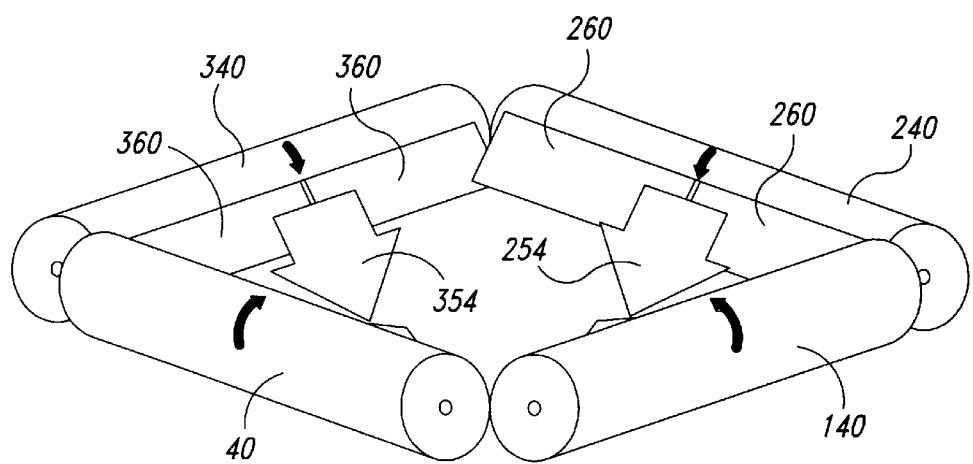
FIG. 11B is an isometric view of another multiple cylinder propulsion system in accordance with the invention.

The outwardly directed thrusts 54, 154, 254, and 354 disperse the total thrust across a larger area, providing greater control for landing maneuvers and reducing the concentration of the downwash. In FIG. 11B, the thrust vectors 54, 154, 254, and 354 are directed inwardly, thereby focusing the thrusts to increase the volume of fluid that is entrained into the layers of accelerated fluid. In operation, the multiple cylinder configuration shown in FIG. 11 may be used to lift and propel a vehicle such as an airplane or hovercraft.

Figure 12:
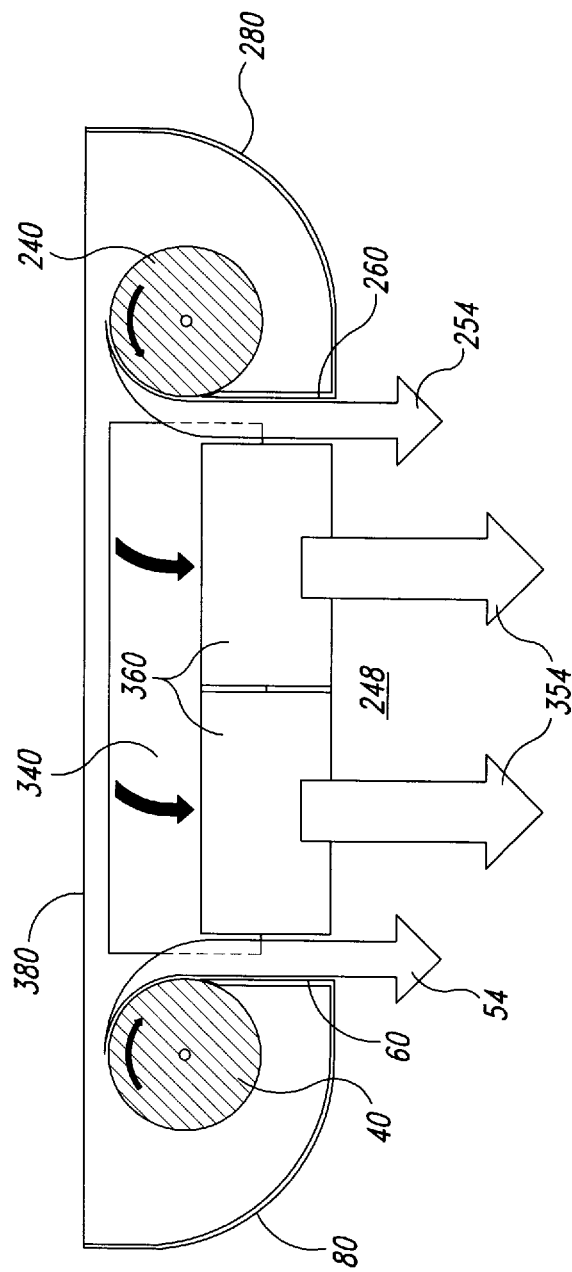
FIG. 12 is a cross-section view of the multiple cylinder propulsion system of FIG. 11A.

FIG. 12 illustrates a cross-section view of the four-cylinder propulsion system 200. To generate maximum lift, the thrust faces 60, 160, 260, and 360 are positioned to direct the thrusts 54, 154, 254 and 354 vertically downward and tangential to the innermost surfaces of the rollers in the convergence zone 248. To generate lateral thrust in combination with vertical thrust, one or more of the separator plates are rotated about their respective cylinders to laterally direct the thrusts at an appropriate angle to achieve the desired lateral thrust.

The propulsion system 200 provides both lift and lateral thrusts by combining three or more rotating cylinders in a configuration in which at least two of the cylinders are positioned generally opposite one another. By providing three or more cylinders, at least two of the cylinders can be dedicated to providing lift thrust while at least one of the cylinders can provide lateral thrust. In one embodiment, the cylinders are configured in opposing pairs such that the cylinders in each pair are substantially parallel to one another. The numbers and configurations of cylinders in such an embodiment may include, but are not limited to, four cylinders in a rectilinear configuration, six cylinders in a hexagonal configuration, or eight cylinders in an octagonal configuration. In another embodiment, the propulsion system 200 may include three cylinders in U-shape or triangular configurations, five cylinders in a pentagonal configuration, or any number of cylinders configured appropriately.

A gyroscopic effect and roll characteristics may be imparted to a vehicle by individually varying the velocity of the cylinders 40, 140, 240, and 340. A left turn with a roll to the left may be executed by reducing the velocity of cylinder 40 and/or increasing the velocity of cylinder 240. Conversely, a right turn with a roll to the right may be executed by increasing the velocity of cylinder 40 and/or decreasing the velocity of cylinder 240.

Figure 13:
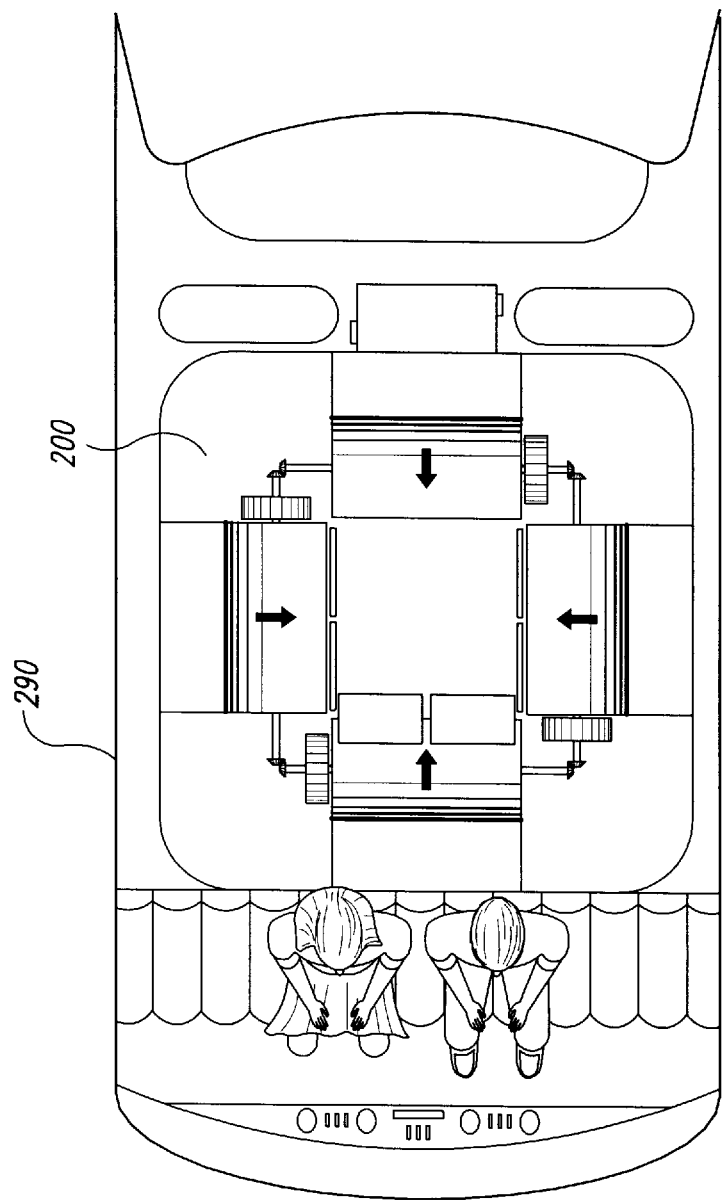
FIG. 13 is a top elevation view of a multiple cylinder propulsion system in accordance with the invention used in connection with an aircraft.

The propulsion system 200 also provides an exceptional amount of lift in a relatively small area, and the cylinders are easily supported by a vehicle. FIG. 13 shows the propulsion system 200 in a hovercraft or plane 290. Unlike conventional rotating wings made from long, cantilevered-mounted cylinders, the cylinders in the propulsion system 200 use a number of shorter cylinders that can be mounted at both ends. By using a number of short cylinders, the propulsion system 200 can have the same overall length of cylinders in a much smaller physical space. Moreover, the cylinders in the propulsion system 200 do not need expensive and complex structural supports such as with cantilevered rollers.

Figure 14:
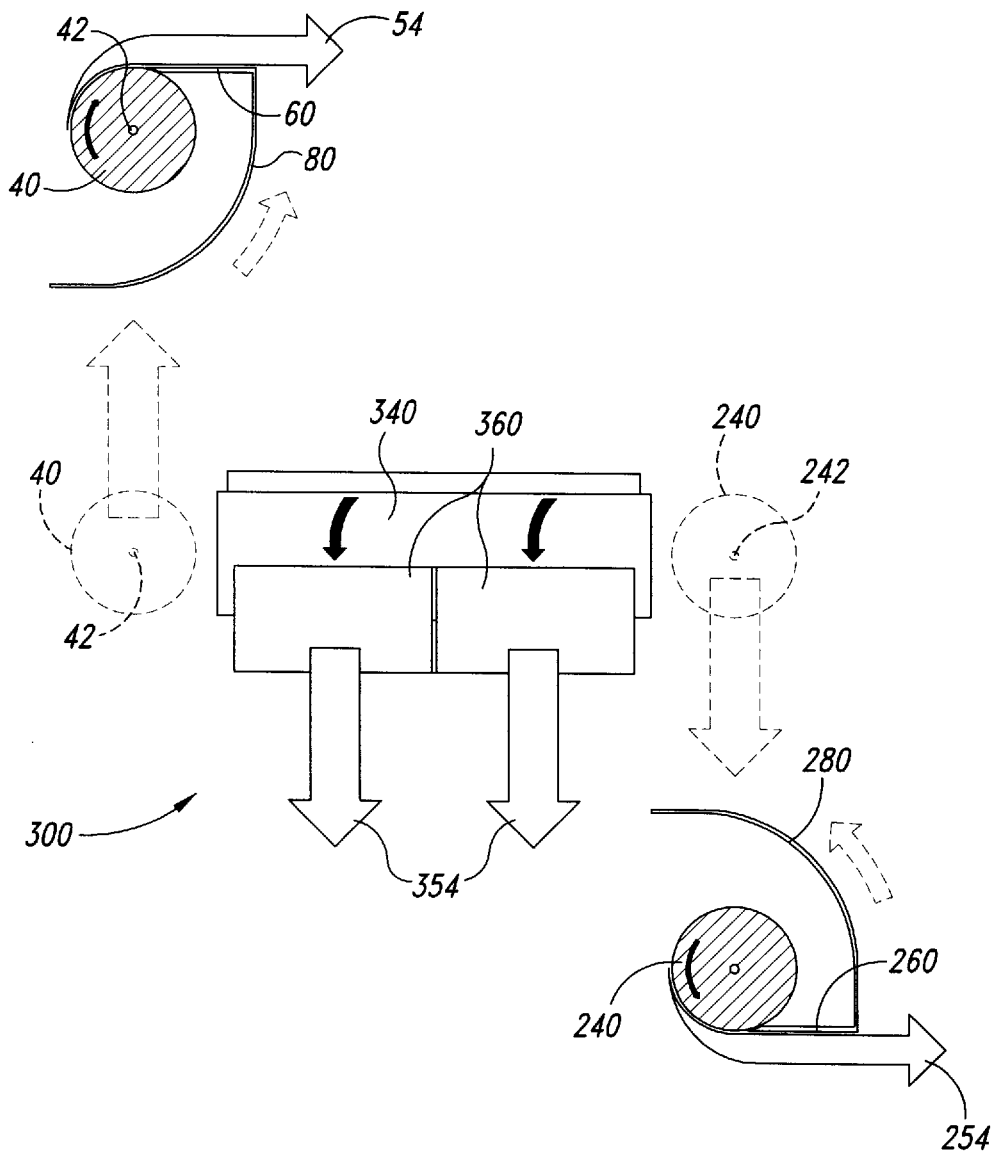
FIG. 14 is a cross-section view of a multiple cylinder propulsion system in accordance with the invention having moveable rotational axes.

FIG. 14 illustrates another embodiment of a multiple cylinder propulsion system 300 in which the rotational axes of the cylinders may be moved to create a propulsion system for producing increased lateral thrust and lateral velocity. The first cylinder 40 may be raised so that its axis of rotation 42 is positioned above its normal position (shown in phantom). Similarly, the third cylinder 240 may be positioned so that its axis of rotation 242 is lower than its normal position (shown in phantom). By moving the axes of rotation, the thrusts 54 and 254 may be directed laterally without disturbing the entrainment of the fluid for cylinders 140 and 340.

Figure 15:
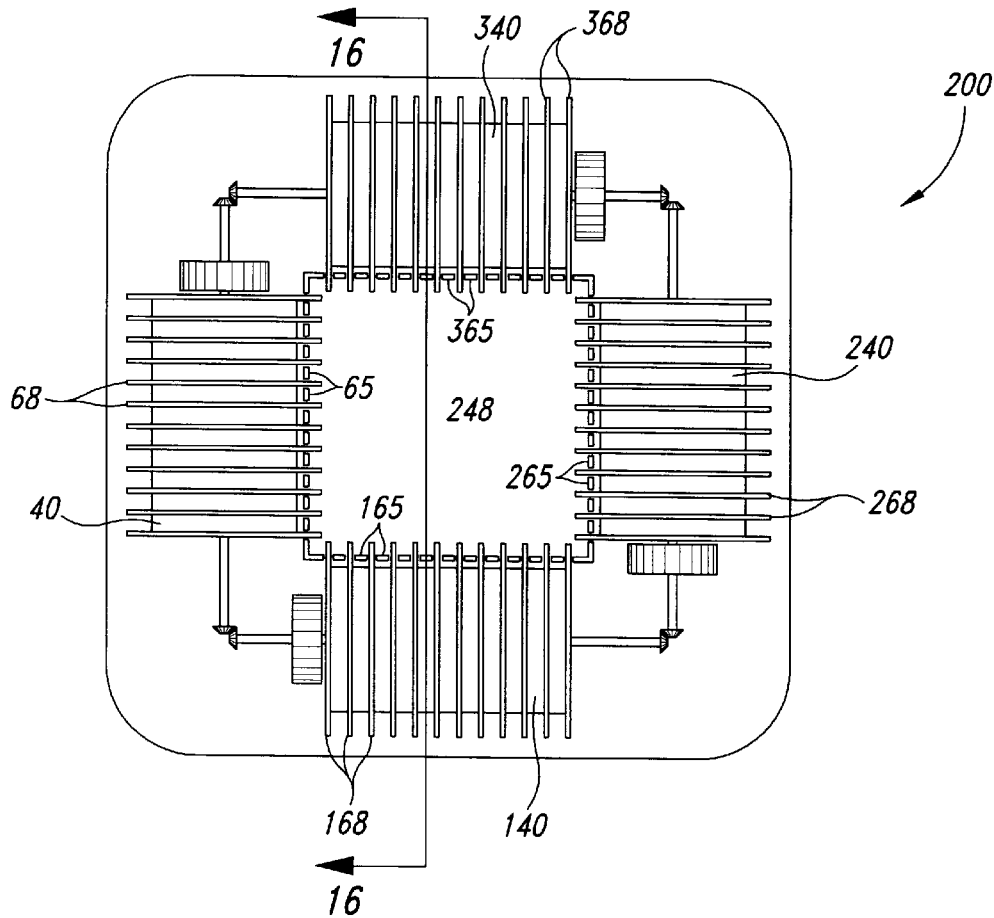
FIG. 15 is a top elevational view of a multiple cylinder propulsion system in accordance with the invention with fins.
Figure 16:
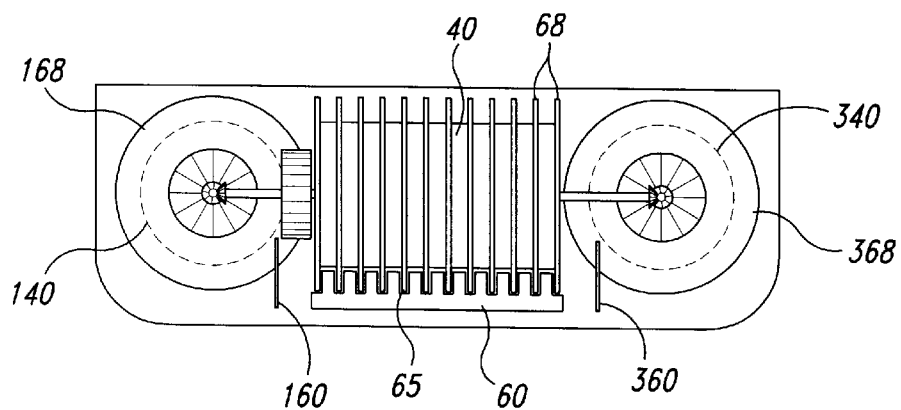
FIG. 16 is a cross-section view of the multiple cylinder propulsion system of FIG. 15.

FIG. 15 shows another embodiment of a multi-cylinder propulsion system 200 having a plurality of disc-like fins 68 attached to the outer surface of the cylinder 40. Similarly, fins 168, 268, and 368 are attached to the outer surfaces of cylinders 140, 240, and 340, respectively. The fins are positioned perpendicular to the outer surface of the cylinders and parallel to the flow of the accelerated fluid. The fins increase the surface area that frictionally contacts the fluid, thereby entraining more fluid into the layers of accelerated fluid and increasing the velocity of the fluid in such layers. As best shown in FIGS. 15 and 16, the separator plate 60 has a plurality of fingers 65 positioned in the space between each of the fins 68. The fingers of the separator plates separate the accelerated fluid from both the outer surface of the cylinders and the surface of the fins, and direct it along the thrust faces of the separator plates as discussed above.

Figure 17:
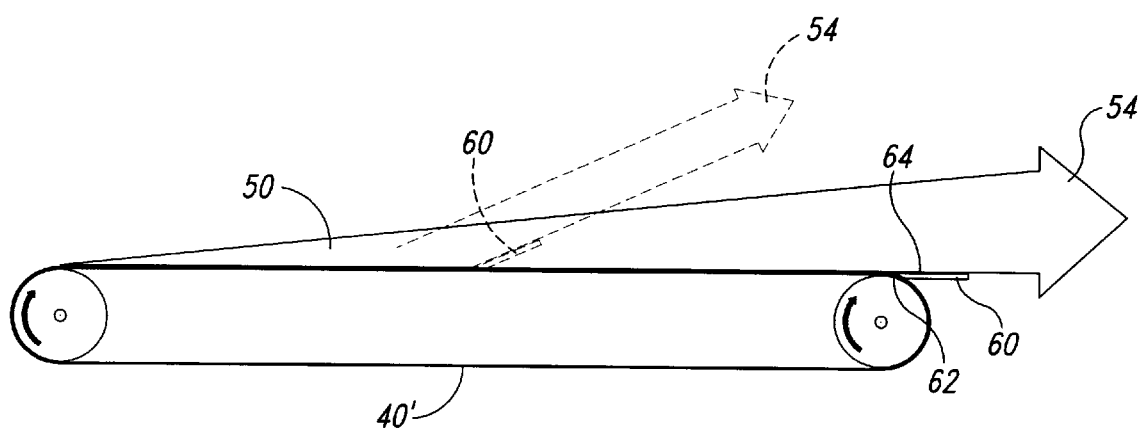
FIG. 17 is a cross-section view of a propulsion system in accordance with the invention in which the dynamic surface is a moveable belt.

The invention contemplates using any type of continuous dynamic surface and is not limited to rotating cylinders. FIG. 17 illustrates another type of continuous dynamic surface that is a belt 40' wrapped around at least two rollers. The belt is driven at a rapid linear rate by at least one of the rollers such that a portion of the belt circulates through the fluid. A separator plate 60 is positioned at one of the rollers where the accelerated fluid is to be separated from the belt. The separator plate 60 may be positioned substantially tangential to the surface of the belt to direct the thrust 54 longitudinally away from the belt, or it may be positioned at an angle (shown in phantom) to direct the thrust to the side of the belt. The type of continuous dynamic surface (e.g., a rotating cylinder or rapidly moving belt) generally does not affect the principles and embodiments disclosed herein. Thus, the invention is not to be limited to rotating cylinders.

The present invention offers several advantages over conventional dynamic surface propulsion systems. First, by separating the accelerated fluid from the dynamic surface along a vector that is tangential to the surface, only the rotational energy of the accelerated fluid is lost to the separator plates. Moreover, by having a substantially flat thrust face adjacent to the leading edge, the invention further minimizes energy loss that would otherwise occur when the accelerated fluid is separated from the dynamic surface. Second, in the case of two or more rotating cylinders, the cylinders are positioned to create a convergence zone that augments the thrust in a desired direction by rotating the cylinders inwardly toward the convergence zone so that the thrust will flow unobstructed between the cylinders in the desired direction of thrust. Third, the invention utilizes three or more rotating cylinders to generate both lift and propulsion thrusts.

It will also be evident that, although specific embodiments of the invention have been described herein for purposes of illustration, various modifications may be made without deviating from the spirit and scope of the invention.

I claim:

1. A fluid propulsion system for accelerating and directionally controlling a fluid, comprising:

a continuous dynamic surface for circulating through the fluid from an entrainment region where fluid is introduced to the dynamic surface and thereafter the fluid proximate to the surface is accelerated so as to produce a layer of accelerated fluid through a thrust region where the accelerated fluid is discharged from the dynamic surface;

a motor operatively connected to the dynamic surface for driving the dynamic surface; and a moveable separator plate having a leading edge for stripping the accelerated fluid in the layer from the dynamic surface and having a substantially flat thrust face adjacent to the leading edge for directing the accelerated fluid in a desired direction to create a thrust flow, the separator plate being moveable with respect to the dynamic surface such that the leading edge is generally in close proximity to the dynamic surface and the thrust face is generally substantially tangential to the dynamic surface along a first tangent of the dynamic surface in a first position and along a second tangent of the dynamic surface in a second position, the first and second positions directing the thrust flow along first and second vectors, respectively.

2. The propulsion system of claim 1 wherein the continuous dynamic surface comprises a rotatable cylinder.

3. A fluid propulsion system for accelerating and directionally controlling a fluid, comprising:

a moveable belt wrapped around two rollers, the belt being driven by at least one of the rollers, and at least a portion of the belt surface defining a continuous dynamic surface for circulating through the fluid from an entrainment region where fluid is introduced to the dynamic surface and thereafter the fluid proximate to the surface is accelerated so as to produce a layer of accelerated fluid through a thrust region where the accelerated fluid is discharged from the dynamic surface;

a motor operatively connected to the dynamic surface for driving the dynamic surface; and a separator plate having a leading edge for stripping the accelerated fluid in the layer from the dynamic surface and having a substantially flat thrust face adjacent to the leading edge for directing the accelerated fluid in a desired direction, the separator plate being positionable with respect to the dynamic surface such that the leading edge is generally in close proximity to the dynamic surface for at least a portion of the thrust region.

4. A fluid propulsion system for accelerating and directionally controlling a fluid, comprising:

a rotatable cylinder defining a continuous dynamic surface for circulating through the fluid from an entrainment region where fluid is introduced to the dynamic surface and thereafter the fluid proximate to the surface is accelerated so as to produce a layer of accelerated fluid through a thrust region where the accelerated fluid is discharged from the dynamic surface;

an entrainment scoop positioned at the entrainment region for directing additional fluid to the cylinder;

a motor operatively connected to the dynamic surface for driving the dynamic surface; and a separator plate having a leading edge for stripping the accelerated fluid in the layer from the dynamic surface and having a substantially flat thrust face adjacent to the leading edge for directing the accelerated fluid in a desired direction, the separator plate being positionable with respect to the dynamic surface such that the leading edge is generally in close proximity to the dynamic surface for at least a portion of the thrust region.

5. The propulsion system of claim 4 wherein the entrainment scoop comprises a curved leaf attached to the separator plate, the curved leaf extending around a portion of the cylinder from the separator plate towards the entrainment region.

6. The propulsion system of claim 4 wherein the entrainment scoop is rotatable about the cylinder.

7. The propulsion system of claim 4 wherein the entrainment scoop further comprises a plurality of segments including a curved leaf and an outer leaf positioned outside of the curved leaf.

8. The propulsion system of claim 7 wherein the curved leaf and outer leaf overlap one another along an area extending substantially parallel to the rotational axis of the cylinder.

9. The propulsion system of claim 7 wherein the leaves comprise a plurality of sections which are divided from one another along a boundary substantially perpendicular to the rotational axis of the cylinder.

10. The propulsion system of claim 1, further comprising a fin attached to the dynamic surface, the fin being positioned perpendicular to the dynamic surface and parallel to the flow of the accelerated fluid.

11. The propulsion system of claim 1 wherein the separator plate is adjustable between a stripping position in which the leading edge is in close proximity to the dynamic surface and a disengaged position in which the leading edge is retracted from the dynamic surface substantially out of the layer of accelerated fluid.

12. A fluid propulsion system for accelerating and directionally controlling a fluid, comprising:
a continuous dynamic surface for circulating through the fluid from an entrainment region where fluid is introduced to the dynamic surface and thereafter the fluid proximate to the surface is accelerated so as to produce a layer of accelerated fluid through a thrust region where the accelerated fluid is discharged from the dynamic surface;
a motor operatively connected to the dynamic surface for driving the dynamic surface; and
a separator plate having a leading edge for stripping the accelerated fluid in the layer from the dynamic surface and having a substantially flat thrust face adjacent to the leading edge for directing the accelerated fluid in a desired direction, the separator plate being adjustable positionable with respect to the dynamic surface between a stripping position in which the leading edge is generally in close proximity to the dynamic surface for at least a portion of the thrust region and a disengaged position in which the leading is retracted from the dynamic surface substantially out of the layer of accelerated fluid, the leading edge having a first end and a second end, and wherein the leading edge is angularly adjustable with respect to the dynamic surface so that one of the ends is closely juxtaposed to the dynamic surface in a stripping position and the other end is at least partially retracted from the surface.

13. A fluid propulsion system for accelerating and directionally controlling a fluid, comprising:
a continuous dynamic surface for circulating through the fluid from an entrainment region where fluid is introduced to the dynamic surface and thereafter the fluid proximate to the surface is accelerated so as to produce a layer of accelerated fluid through a thrust region where the accelerated fluid is discharged from the dynamic surface;
a motor operatively connected to the dynamic surface for driving the dynamic surface; and
a separator plate having a leading edge for stripping the accelerated fluid in the layer from the dynamic surface and having a substantially flat thrust face adjacent to the leading edge for directing the accelerated fluid in a desired direction, the separator plate being positionable with respect to the dynamic surface such that the leading edge is generally in close proximity to the dynamic surface for at least a portion of the thrust region, and wherein the separator plate comprises a plurality of sections, each section having a leading edge and a thrust face, and the sections being individually positionable with respect to the dynamic surface to direct the accelerated fluid in a plurality of directions.

14. The propulsion system of claim 13 wherein each leading edge is adjustable between a stripping position in which the leading edge is in close proximity to the dynamic surface and a retracted position in which the leading edge is retracted from the dynamic surface substantially out of the layer of accelerated fluid.

15. The propulsion system of claim 13 wherein each leading edge has a first end and a second end, the leading edges being angularly adjustable with respect to the dynamic surface so that one of their ends is closely juxtaposed to the dynamic surface in the stripping position and their other end is at least partially retracted from the surface.

16. A fluid propulsion system for accelerating and directionally controlling a fluid, comprising:
a rotatable cylinder defining a continuous dynamic surface for circulating through the fluid from an entrainment region where fluid is introduced to the dynamic surface and thereafter the fluid proximate to the surface is accelerated so as to produce a layer of accelerated fluid through a thrust region where the accelerated fluid is discharged from the dynamic surface;
a motor operatively connected to the dynamic surface for driving the dynamic surface;
a separator plate having a leading edge for stripping the accelerated fluid in the layer from the dynamic surface and having a substantially flat thrust face adjacent to the leading edge for directing the accelerated fluid in a desired direction, the separator plate being positionable with respect to the dynamic surface such that the leading edge is generally in close proximity to the dynamic surface for at least a portion of the thrust region; and
a reverse flow separator plate positioned in the entrainment region, the reverse flow plate being moveable between an engaged position and a retracted position, the reverse flow plate stripping the accelerated fluid from the dynamic surface and directing it in a reversed direction in the engaged position and disengaging the accelerated fluid in the retracted position.

17. A fluid propulsion system for accelerating and directionally controlling a fluid, comprising:
a plurality of rotatable cylinders, each cylinder defining a continuous dynamic surface for circulating through the fluid from an entrainment region where fluid is introduced to the dynamic surface and thereafter the fluid proximate to the surface is accelerated so as to produce a layer of accelerated fluid through a thrust region where the accelerated fluid is discharged from the dynamic surface, wherein the rotatable cylinders are configured so that each cylinder is juxtaposed to another cylinder to position the entrainment regions proximate to one another and facing a common area that forms a convergence zone between the cylinders;
a motor operatively connected to the dynamic surface for driving the dynamic surface; and
a plurality of separator plates, each separator plate being positioned in a thrust region of a corresponding cylinder so that each separator plate is juxtaposed to another separator plate, each separator plate having a leading edge for stripping the accelerated fluid in the layer from a corresponding cylinder and having a substantially flat thrust face adjacent to the leading edge for directing the accelerated fluid in a desired direction, each separator plate also being positionable with respect to the corresponding cylinder such that the leading edge is generally in close proximity to the corresponding cylinder for at least a portion of the corresponding thrust region.

18. A fluid propulsion system for accelerating and directionally controlling a fluid, comprising:

a continuous dynamic surface for circulating through the fluid from an entrainment region where fluid is introduced to the dynamic surface and thereafter the fluid proximate to the surface is accelerated so as to produce a layer of accelerated fluid through a thrust region where the accelerated fluid is discharged from the dynamic surface, the continuous dynamic surface being defined by plurality of rotatable cylinders configured in opposing pairs to define an entrainment convergence zone between the cylinders, each cylinder being positioned substantially parallel to its opposing cylinder;

a motor operatively connected to the dynamic surface for driving the dynamic surface; and a plurality of separator plates in which each cylinder has a corresponding separator plate positioned in its thrust region and in the convergence zone opposite at least one other separator plate, each separator plate having a leading edge for stripping the accelerated fluid in the layer from a corresponding cylinder and having a substantially flat thrust face adjacent to the leading edge for directing the accelerated fluid in a desired direction, the separator plates being positionable with respect to the corresponding cylinders such that each leading edge is generally in close proximity to its corresponding cylinder for at least a portion of the thrust region.

19. The propulsion system of claim 17 wherein each separator plate is positionable about its corresponding cylinder.

20. The propulsion system of claim 17 wherein each separator plate has a plurality of sections, each section being positionable about its corresponding cylinder.

21. The propulsion system of claim 17 wherein the velocity of the dynamic surface is variable.

22. A fluid propulsion system for accelerating and directionally controlling a fluid, comprising:

a plurality of cylinders, each cylinder having an outer surface rotatable through the fluid from an entrainment region where fluid is introduced to the outer surface and thereafter the fluid proximate to the outer surface is accelerated to produce a layer of accelerated fluid through a thrust region where the fluid is discharged from the outer surface, the cylinders being spaced apart to define an entrainment convergence zone between the cylinders and the cylinders being rotatable inwardly towards the convergence zone so that the accelerated fluid from each cylinder flows through the convergence zone between the cylinders in a desired direction of thrust;

a motor operatively connected to the cylinders for rotating the cylinders; and a plurality of thrust separator plates each having a leading edge and a thrust face, wherein each cylinder has at least one corresponding separator plate positioned in its thrust region and each separator plate is positionable in the convergence zone and moveable with respect to its corresponding cylinder.

23. The fluid propulsion system of claim 22 wherein the cylinders include two cylinders positioned substantially parallel to one another.

24. The fluid propulsion system of claim 23, further comprising an entrainment scoop coupled to each cylinder, each entrainment scoop being positioned generally opposite of the entrainment convergence zone.

25. The fluid propulsion system of claim 22 wherein the cylinders include at least three cylinders.

26. The fluid propulsion system of claim 22 wherein the velocity of each cylinder is variable and controllable independently of the other cylinders.

27. A fluid propulsion system for accelerating and directionally controlling a fluid, comprising:

a rotatable cylinder defining a continuous dynamic surface for circulating through the fluid from an entrainment region where fluid is introduced to the dynamic surface and thereafter the fluid proximate to the surface is accelerated so as to produce a layer of accelerated fluid through a thrust region where the accelerated fluid is discharged from the dynamic surface;

a motor operatively connected to the dynamic surface for driving the dynamic surface;

a separator plate having a leading edge for stripping the accelerated fluid in the layer from the dynamic surface and having a substantially flat thrust face adjacent to the leading edge for directing the accelerated fluid in a desired direction, the separator plate being positionable with respect to the dynamic surface such that the leading edge is generally in close proximity to the dynamic surface for at least a portion of the thrust region; and an entrainment scoop positioned at the entrainment region, the entrainment scoop defining a shield having a first end proximate to the separator plate and a second end spaced apart from the separator plate around a portion of the cylinder.

28. The propulsion system of claim 27 wherein the first end of the shield is connected to a portion of the separator plate.

29. A fluid propulsion system for accelerating and directionally controlling a fluid, comprising:

a rotatable cylinder defining a continuous dynamic surface for circulating through the fluid from an entrainment region where fluid is introduced to the dynamic surface and thereafter the fluid proximate to the surface is accelerated so as to produce a layer of accelerated fluid through a thrust region where the accelerated fluid is discharged from the dynamic surface;

a motor operatively connected to the dynamic surface for driving the dynamic surface; and a separator plate having a leading edge for stripping the accelerated fluid in the layer from the dynamic surface and having a substantially flat thrust face adjacent to the leading edge for directing the accelerated fluid in a desired direction, the separator plate being positionable with respect to the dynamic surface such that the leading edge is spaced apart from the dynamic surface in the thrust region by a distance within the layer of accelerate fluid.

30. The propulsion system of claim 29 wherein the dynamic surface is a rotatable cylinder and the separator plate is moveable along a radius of the rotatable cylinder to adjust the distance between the leading edge of the separator plate and the cylinder.

31. A fluid propulsion system for accelerating and directionally controlling a fluid, comprising:
- a rotatable cylinder defining a continuous dynamic surface for circulating through the fluid from an entrainment region where fluid is introduced to the dynamic surface and thereafter the fluid proximate to the surface is accelerated so as to produce a layer of accelerated fluid through a thrust region where the accelerated fluid is discharged from the dynamic surface;
- a plurality of fins attached to the rotatable cylinder, the fins projecting radially outwardly from the rotatable cylinder and the fins being spaced apart from one another along a rotational axis of the cylinder;
- a motor operatively connected to the dynamic surface for driving the dynamic surface; and
- a separator plate having a plurality of fingers for stripping the accelerated fluid in the layer from the dynamic surface and having a substantially flat thrust face extending from the fingers for directing the accelerated fluid in a desired direction, each finger being positioned between a pair of fins and the fingers having a cross-sectional shape, wherein the separator plate is positionable with respect to the dynamic surface such that fingers are spaced apart from the cylinder in the thrust region by a distance.

32. The propulsion system of claim 31 wherein the fingers have a rectilinear cross-section.

33. The propulsion system of claim 31, further comprising an entrainment scoop positioned at the entainment region, the entainment scoop defining a shield having a first end proximate to the separator plate and a second end spaced apart from the separator plate around a portion of the cylinder.

* * * * *